(12) United States Patent
Chang et al.

(10) Patent No.: US 12,189,152 B2
(45) Date of Patent: Jan. 7, 2025

(54) SENSOR LENS ASSEMBLY

(71) Applicant: TONG HSING ELECTRONIC INDUSTRIES, LTD., Taipei (TW)

(72) Inventors: Chia-Shuai Chang, Hsin-Chu County (TW); Chien-Chen Lee, Hsin-Chu County (TW); Li-Chun Hung, Hsin-Chu County (TW)

(73) Assignee: TONG HSING ELECTRONIC INDUSTRIES, LTD., Taipei (TW)

(*) Notice: Subject to any disclaimer, the term of this patent is extended or adjusted under 35 U.S.C. 154(b) by 123 days.

(21) Appl. No.: 18/166,446

(22) Filed: Feb. 8, 2023

(65) Prior Publication Data
US 2023/0393313 A1 Dec. 7, 2023

Related U.S. Application Data
(60) Provisional application No. 63/349,565, filed on Jun. 6, 2022.

(30) Foreign Application Priority Data
Nov. 29, 2022 (TW) ................................ 111145544

(51) Int. Cl.
G02B 5/02 (2006.01)
H04N 23/54 (2023.01)
H04N 23/55 (2023.01)

(52) U.S. Cl.
CPC ......... *G02B 5/0278* (2013.01); *G02B 5/0221* (2013.01); *H04N 23/54* (2023.01); *H04N 23/55* (2023.01)

(58) Field of Classification Search
CPC .... G02B 5/0278; G02B 5/0221; H04N 23/54; H04N 23/55; H04N 25/60; H04N 25/61
See application file for complete search history.

(56) References Cited

U.S. PATENT DOCUMENTS

| | | | |
|---|---|---|---|
| 7,616,250 B2 | 11/2009 | Watanabe et al. | |
| 2005/0275741 A1* | 12/2005 | Watanabe | H01L 27/14618 257/E31.118 |
| 2007/0018309 A1* | 1/2007 | Chang | H01L 27/14618 438/26 |
| 2008/0055729 A1 | 3/2008 | Li et al. | |
| 2010/0289938 A1 | 11/2010 | Yen | |

(Continued)

*Primary Examiner* — Albert H Cutler
(74) *Attorney, Agent, or Firm* — Li & Cai Intellectual Property Office (57) ABSTRACT

A sensor lens assembly includes a circuit board, an optical module assembled onto the circuit board, and a sensing module that is surrounded by the optical module. The sensing module includes a sensor chip disposed on and electrically coupled to the circuit board, a supporting layer having a ring shape and disposed on the sensor chip, and a light-permeable layer. The light-permeable layer is disposed on the supporting layer through a ring-shaped segment thereof, so that the light-permeable layer, the supporting layer, and the sensor chip jointly define an enclosed space. The ring-shaped segment has a ring-shaped roughened region. A projection space defined by orthogonally projecting the ring-shaped roughened region toward the sensor chip is located outside of a sensing region of the sensor chip and overlaps an entirety of the supporting layer and a part of the enclosed space.

9 Claims, 11 Drawing Sheets

(56) References Cited

U.S. PATENT DOCUMENTS

2013/0271649 A1* 10/2013 Halliday ................ H04N 23/55
                                                              348/374
2020/0312897 A1* 10/2020 Hsieh ................ H01L 27/14683
2023/0273352 A1*  8/2023 Cano .................... G02B 5/0268
                                                                359/1

* cited by examiner

SENSOR LENS ASSEMBLY

CROSS-REFERENCE TO RELATED PATENT APPLICATION

This application claims the benefit of priority to Taiwan Patent Application No. 111145544, filed on Nov. 29, 2022. The entire content of the above identified application is incorporated herein by reference.

This application claims the benefit of priority to the U.S. Provisional Patent Application Ser. No. 63/349,565 filed on Jun. 6, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a lens, and more particularly to a sensor lens assembly.

BACKGROUND OF THE DISCLOSURE

A conventional sensor lens assembly is manufactured by fixing a sensor chip onto a circuit board and then assembling an optical module to the circuit board. However, light passing through the optical module and traveling onto the sensor chip is easily reflected to affect a sensing region of the sensor chip (e.g., a flare phenomenon).

SUMMARY OF THE DISCLOSURE

In response to the above-referenced technical inadequacy, the present disclosure provides a sensor lens assembly to effectively improve on the issues associated with conventional sensor lens assemblies.

In order to solve the above-mentioned problems, one of the technical aspects adopted by the present disclosure is to provide a sensor lens assembly, which includes a circuit board, an optical module, and a sensing module. The optical module includes a frame fixed to the circuit board and at least one lens that is assembled into the frame. The circuit board, the frame, and the at least one lens jointly define a distribution space. The sensing module is arranged in the distribution space and includes a sensor chip, a supporting layer, and a light-permeable layer. The sensor chip is disposed on and electrically coupled to the circuit board, and a top surface of the sensor chip includes a sensing region and a carrying region that surrounds the sensing region. The supporting layer has a ring shape and is disposed on the carrying region of the sensor chip. The light-permeable layer has an outer surface and an inner surface that is opposite to the outer surface. The light-permeable layer has a transparent segment and a ring-shaped segment that surrounds the transparent segment, and wherein the ring-shaped segment is disposed on the supporting layer, and the light-permeable layer, the supporting layer, and the sensor chip jointly define an enclosed space. The ring-shaped segment has a ring-shaped roughened region, and a projection space defined by orthogonally projecting the ring-shaped roughened region toward the top surface of the sensor chip is located outside of the sensing region and overlaps an entirety of the supporting layer and a part of the enclosed space.

In order to solve the above-mentioned problems, another one of the technical aspects adopted by the present disclosure is to provide a sensor lens assembly, which includes a circuit board, an optical module, and a sensing module. The optical module includes a frame fixed to the circuit board, at least one lens assembled into the frame, and a light-permeable layer that is assembled into the frame. The circuit board, the frame, and the light-permeable layer jointly define a distribution space, and the at least one lens is arranged outside of the distribution space. The light-permeable layer having an outer surface and an inner surface that is opposite to the outer surface. The light-permeable layer has a transparent segment and a ring-shaped segment that surrounds the transparent segment, and the ring-shaped segment has a ring-shaped roughened region. The sensing module is arranged in the distribution space and includes a sensor chip and a plurality of metal wires. The sensor chip is disposed on the circuit board, and a top surface of the sensor chip includes a sensing region and a carrying region that surrounds the sensing region. Two ends of each of the metal wires are respectively connected to the circuit board and the carrying region of the sensor chip, so that the circuit board and the sensor chip are electrically coupled to each other. Moreover, a projection space defined by orthogonally projecting the ring-shaped roughened region toward the circuit board overlaps the metal wires and surrounds the sensing region.

Therefore, since the sensor lens assembly of the present disclosure is provided with the ring-shaped roughened region formed on the ring-shaped segment of the light-permeable layer, light traveling onto the ring-shaped roughened region by passing through the light-permeable layer can be scattered, thereby effectively reducing the flare phenomenon of the sensor lens assembly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 1:
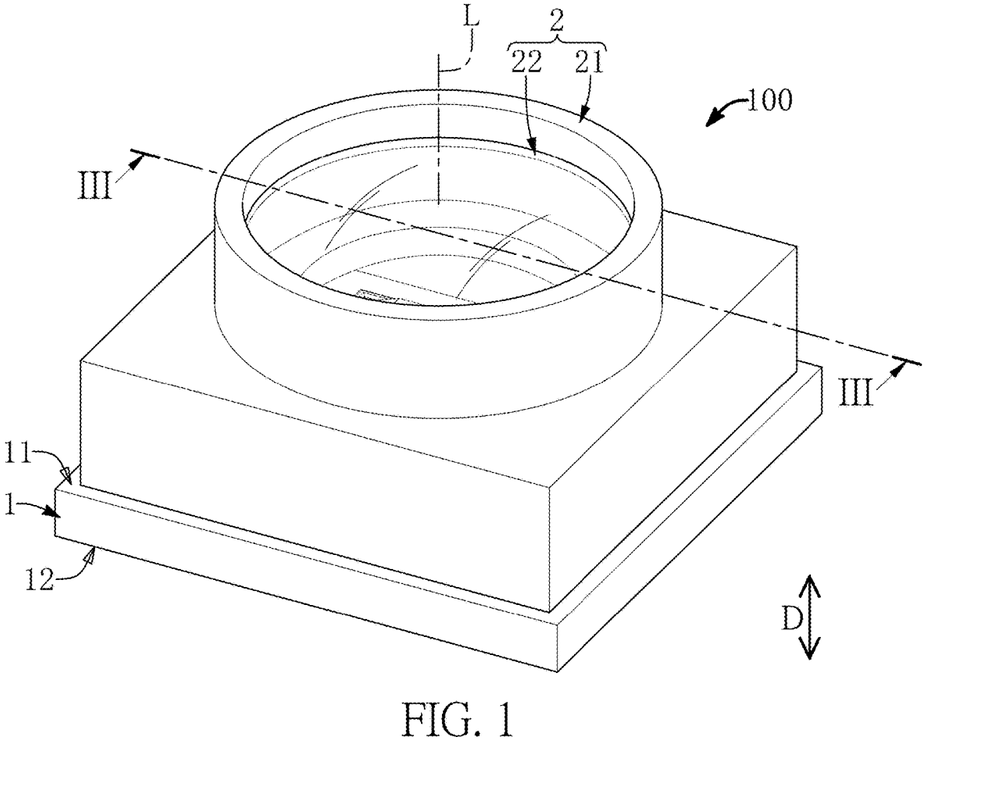
FIG. 1 is a perspective view of a sensor lens assembly according to a first embodiment of the present disclosure.
Figure 2:
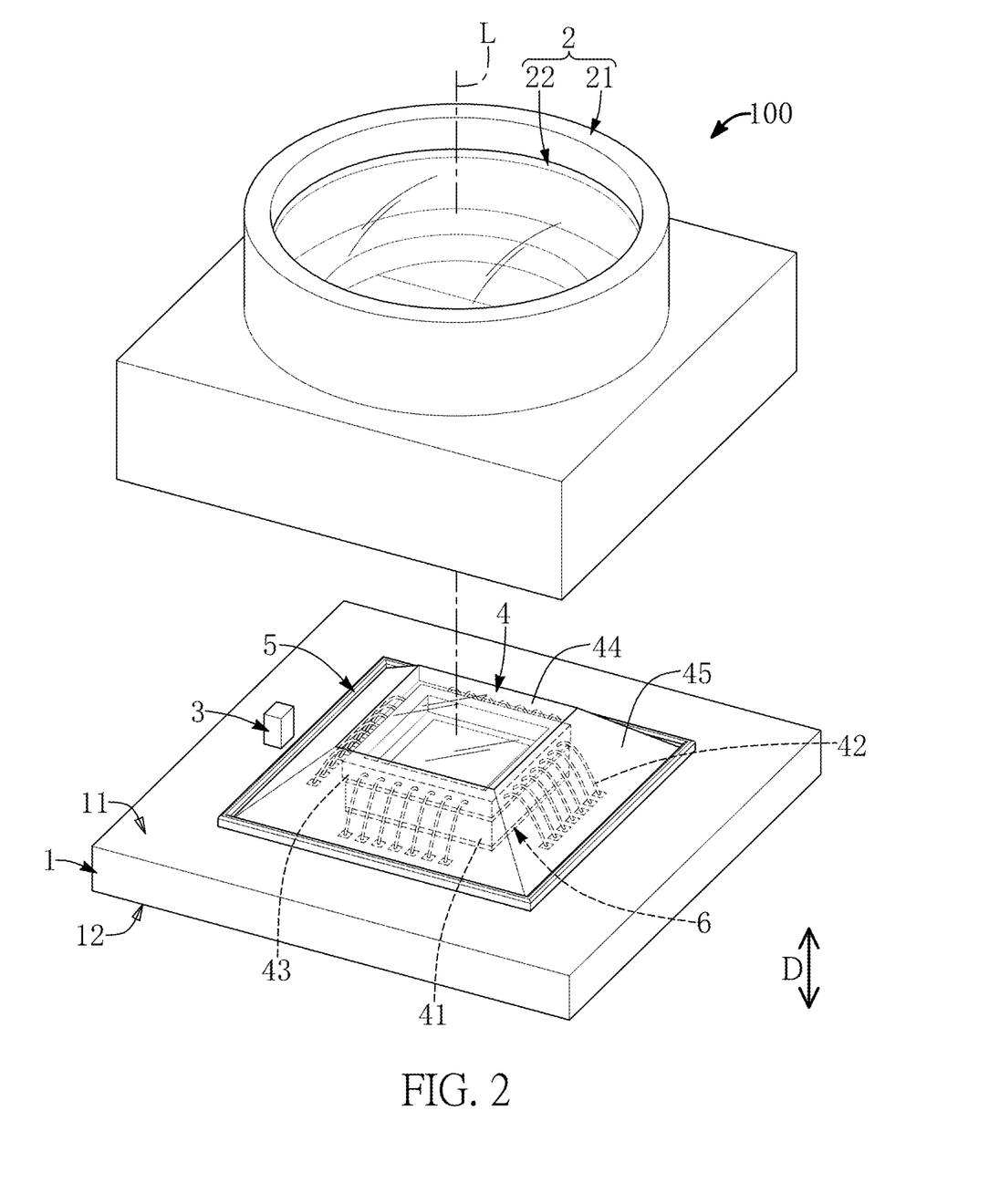
FIG. 2 is an exploded view of FIG. 1.

Referring to FIG. 1 to FIG. 5, a first embodiment of the present disclosure provides a sensor lens assembly 100. As shown in FIG. 1 and FIG. 2, the sensor lens assembly 100 of the present embodiment does not have any package structure therein. In other words, any sensor lens assembly, which has a package structure, is different from the sensor lens assembly 100 of the present embodiment.

Figure 3:
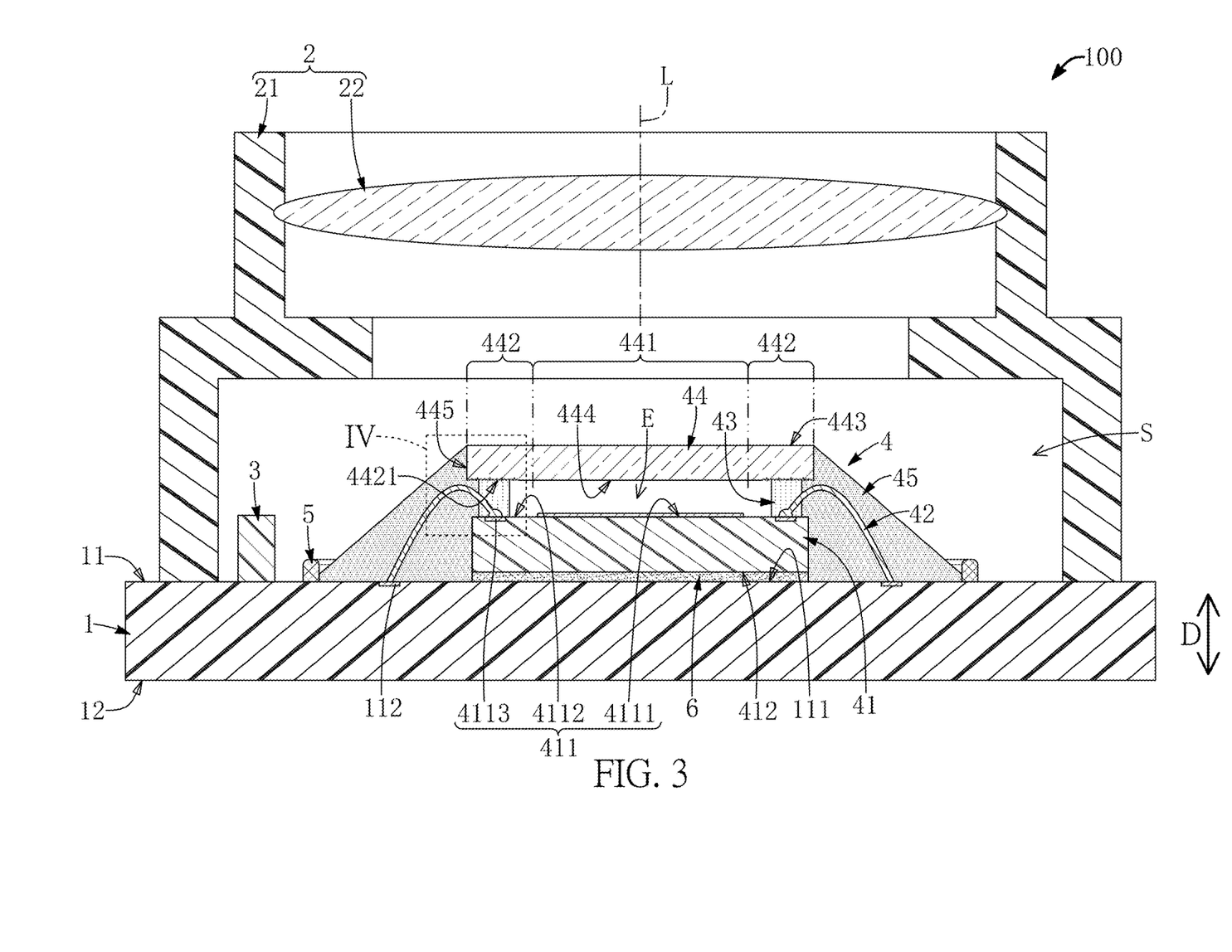
FIG. 3 is a cross-sectional view taken along line III-III of FIG. 2.
Figure 4A:
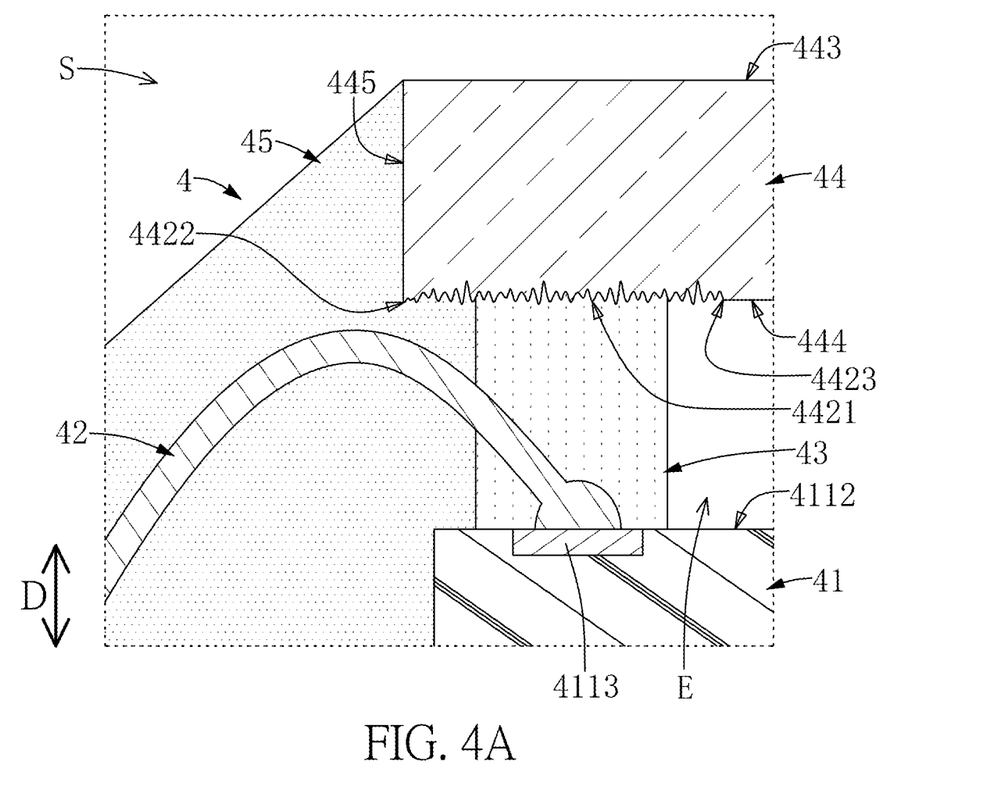
FIG. 4A is an enlarged view of part IV of FIG. 3.

As shown in FIG. 3 and FIG. 4A, the sensor lens assembly 100 includes a circuit board 1, an optical module 2 fixed to the circuit board 1, at least one passive electronic component 3 assembled to the circuit board 1, a sensing module 4 assembled to the circuit board 1, and a retaining wall 5 that is arranged between the at least one passive electronic component 3 and the sensing module 4. The sensor lens assembly 100 in the present embodiment is described by including the above components, but the sensor lens assembly 100 can be adjusted or changed according to design requirements. For example, in other embodiments of the present disclosure not shown in the drawings, the sensor lens assembly 100 can be provided with the at least one passive electronic component 3 and/or the retaining wall 5 being omitted.

The circuit board 1 in the present embodiment can be a printed circuit board (PCB) or a flexible printed circuit (FPC), but the present disclosure is not limited thereto. The circuit board 1 has a first surface 11 and a second surface 12 that is opposite to the first surface 11. The circuit board 1 includes a chip-bonding region 111 arranged on the first surface 11 and a plurality of bonding pads 112 that are arranged on the first surface 11 and outside of the chip-bonding region 111.

The optical module 2 includes a frame 21 and at least one lens 22 that is assembled into the frame 21. A bottom of the frame 21 is fixed to the first surface 11 of the circuit board 1, a central axis L of the at least one lens 22 passes through the chip-bonding region 111, and the at least one passive electronic component 3 is assembled to the first surface 11 of the circuit board 1 and is arranged adjacent to the frame 21. Moreover, in other embodiments of the present disclosure not shown in the drawings, a quantity of the at least one passive electronic component 3 can be adjusted or changed, and the optical module 2 can further add other components (e.g., a filtering sheet) according to design requirements.

The circuit board 1 (e.g., the first surface 11), the frame 21, and the at least one lens 22 jointly define a distribution space S (being enclosed). Moreover, the at least one passive electronic component 3 and the sensing module 4 are arranged in the distribution space S.

The sensing module 4 in the present embodiment includes a sensor chip 41 assembled to the circuit board 1, a plurality of metal wires 42 electrically coupled to the sensor chip 41 and the circuit board 1, a supporting layer 43 disposed on the sensor chip 41, a light-permeable layer 44 disposed on the supporting layer 43, and a sealing compound 45 that is formed on the circuit board 1, but the present disclosure is not limited thereto. For example, in other embodiments of the present disclosure not shown in the drawings, the sensing module 4 can be provided without the metal wires 42, and the sensor chip 41 is fixed onto and electrically coupled to the circuit board 1 in a flip-chip manner or a die-bonding manner; or, the sensing module 4 can be provided without the sealing compound 45.

The sensor chip 41 in the present embodiment is an image sensor chip, but the present disclosure is not limited thereto. The sensor chip 41 is fixed onto the chip-bonding region 111 of the substrate 1 along a predetermined direction D (e.g., a bottom surface 412 of the sensor chip 41 faces toward the chip-bonding region 111) and is located at the central axis L. In other words, the sensor chip 41 is arranged to be surrounded on the inside of the bonding pads 112.

It should be noted that the sensor lens assembly 100 of the present embodiment includes an adhesive 6 (e.g., an epoxy adhesive or a chip-bonding film) disposed on the chip-bonding region 111, and the sensor chip 41 is fixed to the chip-bonding region 111 through the adhesive 6 (e.g., the bottom surface 412 of the sensor chip 41 and the chip-bonding region 111 are adhered to each other through the adhesive 6), but the present disclosure is not limited thereto. For example, in other embodiments of the present disclosure not shown in the drawings, the adhesive 6 can be omitted or replaced by other components.

Moreover, a top surface 411 of the sensor chip 41 has a sensing region 4111 and a carrying region 4112 that has a ring shape arranged around the sensing region 4111. Two ends of each of the metal wires 42 are respectively connected to the circuit board 1 and the carrying region 4112 of the sensor chip 41, so that the circuit board 1 and the sensor chip 41 are electrically coupled to each other.

Specifically, the sensor chip 41 includes a plurality of connection pads 4113 arranged outside of the carrying region 4112. In other words, the connection pads 4113 are arranged outside of the sensing region 4111. The number and positions of the connection pads 4113 of the sensor chip 41 in the present embodiment correspond to those of the bonding pads 112 of the circuit board 1. In other words, the connection pads 4113 in the present embodiment are substantially in a ring-shaped arrangement. Moreover, the two ends of each of the metal wires 42 are respectively connected to one of the bonding pads 112 and the corresponding connection pad 4113.

The supporting layer 43 is disposed on the carrying region 4112 of the sensor chip 41 and surrounds the sensing region 4111. Moreover, the supporting layer 43 in the present embodiment is limited to be an ultraviolet (UV) curing layer (or a curing layer). In other words, the supporting layer 43 of the present embodiment is a structure that can be cured by being irradiated with a UV light, but the present disclosure is not limited thereto.

Figure 5:
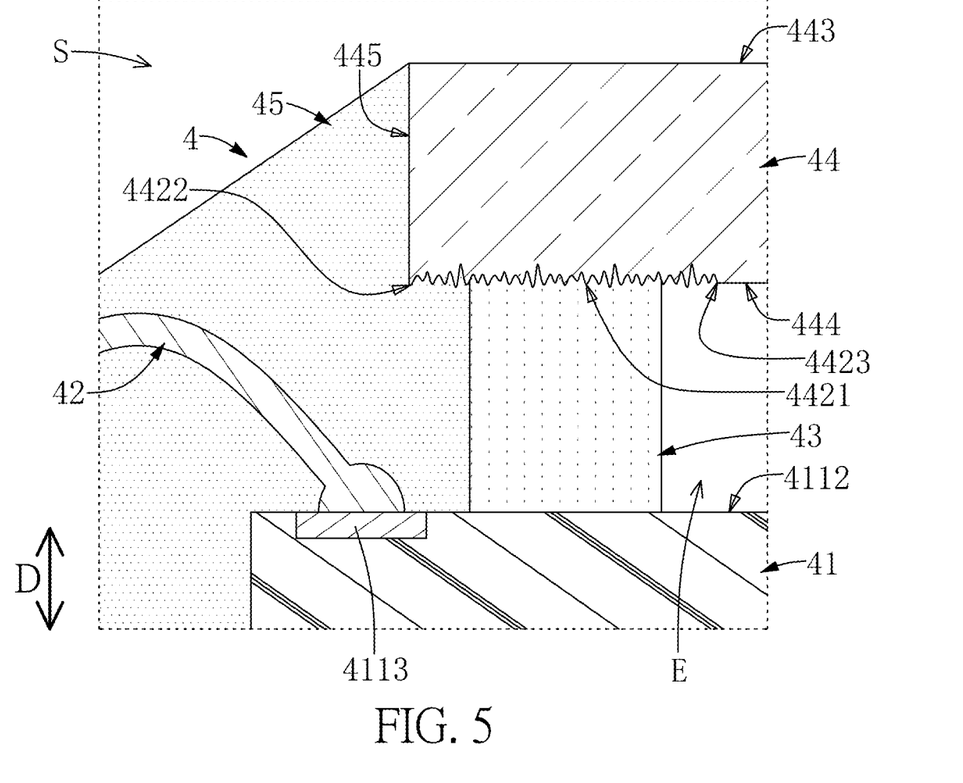
FIG. 5 is an enlarged view showing the part IV of FIG. 3 in yet another configuration.

Specifically, as shown in FIG. 4A, a part of each of the metal wires 42 is embedded in the supporting layer 43, and a remaining part of each of the metal wires 42 is embedded in the sealing compound 45, but the present disclosure is not limited thereto. For example, as shown in FIG. 5, the supporting layer 43 can be arranged inside of the metal wires 42 and not be in contact with any one of the metal wires 42 (i.e., each of the metal wires 42 is arranged outside of the supporting layer 43 and is embedded in the sealing compound 45).

As shown in FIG. 3 and FIG. 4A, the light-permeable layer 44 in the present embodiment is a transparent and flat glass board, but the present disclosure is not limited thereto. The light-permeable layer 44 has a transparent segment 441 and a ring-shaped segment 442 that surrounds the transparent segment 441. The light-permeable layer 44 is disposed on the supporting layer 43 through the ring-shaped segment 442, so that the light-permeable layer 44, the supporting layer 43, and the sensor chip 41 jointly define an enclosed space E.

It should be noted that the shape and size of the transparent segment 441 in the present embodiment substantially correspond to those of the sensing region 4111; in other words, a projection region defined by orthogonally projecting the transparent segment 441 onto the top surface 411 of the sensor chip 41 along the predetermined direction D is substantially overlapped with an entirety of the sensing region 4111, but the present disclosure is not limited thereto. For example, in other embodiments of the present disclosure not shown in the drawings, the size of the transparent segment 441 can be slightly greater than that of the sensing region 4111.

Moreover, the ring-shaped segment 442 has a ring-shaped roughened region 4421, and a top side of the supporting layer 43 is substantially and gaplessly connected to the ring-shaped roughened region 4421. In other words, the top side of the supporting layer 43 and the ring-shaped roughened region 4421 are concave-convex structures being complementary to each other. Furthermore, a projection space defined by orthogonally projecting the ring-shaped roughened region 4421 toward the top surface 411 of the sensor chip 41 (along the predetermined direction D) is located outside of the sensing region 4111 and overlaps an entirety of the supporting layer 43 and a part of the enclosed space E.

Accordingly, the sensor lens assembly 100 of the present embodiment is provided with the ring-shaped roughened region 4421 formed on the ring-shaped segment 442 of the light-permeable layer 44, so that the bonding force between the light-permeable layer 44 and the supporting layer 43 can be increased for effectively preventing the light-permeable layer 44 from peeling off the supporting layer 43 or preventing the light-permeable layer 44 and the supporting layer 43 from having a delamination therebetween. It should be noted that the ring-shaped roughened region 4421 formed on the light-permeable layer 44 has a lower production difficulty and a lower cost with respect to the ring-shaped roughened region 4421 formed on other components (e.g., the sensor chip 41 or the supporting layer 43), so that any roughened region not formed on a light-permeable layer is different from the ring-shaped roughened region 4421 provided by the present embodiment.

Moreover, since the sensor lens assembly 100 of the present embodiment is provided with the ring-shaped roughened region 4421 formed on the ring-shaped segment 442 of the light-permeable layer 44, light traveling onto the ring-shaped roughened region 4421 by passing through the optical module 2 and the light-permeable layer 44 can be scattered to prevent the light from being reflected to the sensing region 4111 through the supporting layer 43, thereby effectively reducing the flare phenomenon of the sensor lens assembly 100.

In addition, the light-permeable layer 44 of the present embodiment is configured to allow light passing through the ring-shaped segment 442 to be scattered at the ring-shaped roughened region 4421 toward the supporting layer 4. In order to enable the supporting layer 43 to be uniformly irradiated, the light-permeable layer 44 of the present embodiment preferably has at least part of the following features, but the present disclosure is not limited thereto.

The light-permeable layer 44 has an outer surface 443, an inner surface 444 that is opposite to the outer surface 443, and a surrounding lateral surface 45 that is connected to the outer surface 443 and the inner surface 444. The ring-shaped roughened region 4421 is formed on the inner surface 444 of the light-permeable layer 44 (i.e., a part of the inner surface 444 on the ring-shaped segment 442), and an outer edge 4422 of the ring-shaped roughened region 4421 is arranged outside of the supporting layer 43 and is preferably flush with the surrounding lateral surface 445. Accordingly, the ring-shaped roughened region 4421 can be provided to increase an area of the light-permeable layer 44 in contact with the supporting layer 43 and the sealing compound 45, thereby increasing the bonding force between the light-permeable layer 44 and any one of the supporting layer 43 and the sealing compound 45.

Figure 4B:
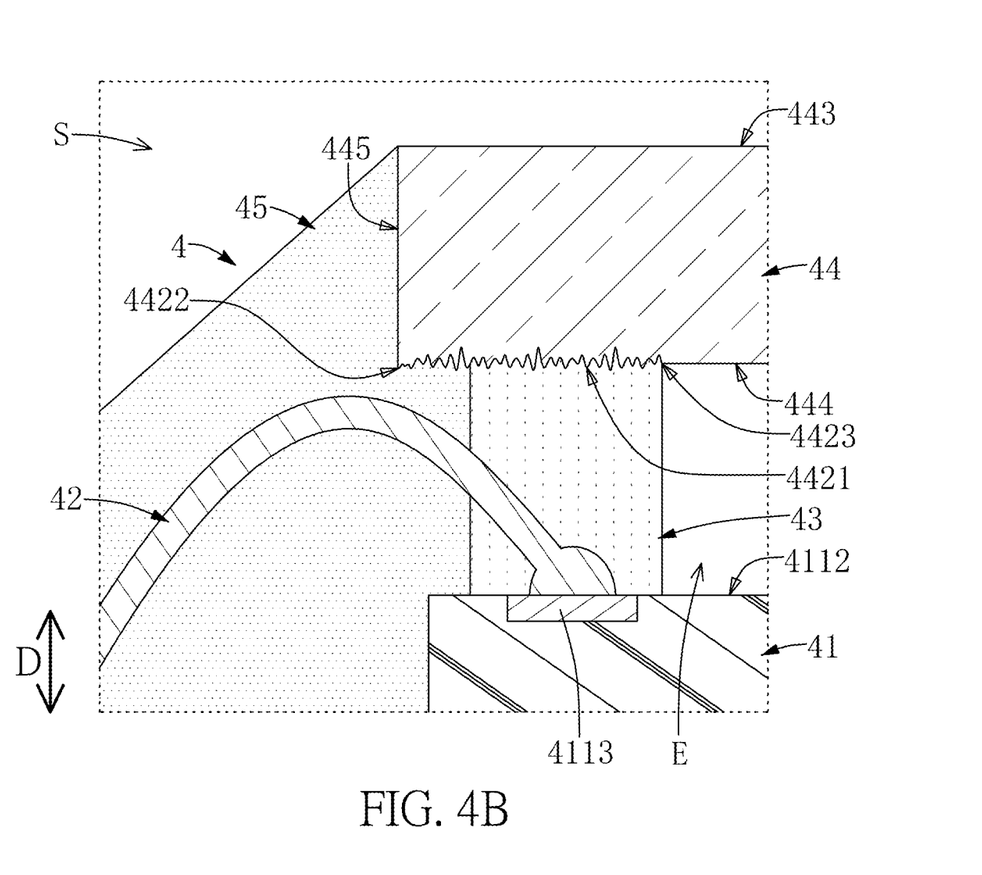
FIG. 4B is an enlarged view showing the part IV of FIG. 3 in another configuration.

In addition, an inner edge 4423 of the ring-shaped roughened region 4421 can be located in the enclosed space E (or located inside of the supporting layer 43) as shown in FIG. 4A, but the inner edge 4423 is not in contact with the transparent segment 441; or, the inner edge 4423 of the ring-shaped roughened region 4421 can be flush with an inner side of the supporting layer 43 (i.e., the inner edge 4423 is not located in the enclosed space E) as shown in FIG. 4B.

Moreover, the ring-shaped roughened region 4421 can be an irregular configuration as shown in FIG. 4A or FIG. 4B according to design requirements. The ring-shaped roughened region 4421 in the present embodiment has a haze being within a range from 10% to 90%, and the haze is preferably within a range from 30% to 90%, but the present disclosure is not limited thereto.

In summary, when the supporting layer 43 of the sensor lens assembly 100 in the present embodiment is the light curing layer, the ring-shaped roughened region 4421 enables a lot of light to be scattered onto the supporting layer 43 by having a specific condition, so that the supporting layer 43 can be entirely solidified to prevent the light-permeable layer 44 from being tilted and to further prevent the supporting layer 43 and the light-permeable layer 44 from having the delamination therebetween. Accordingly, the yield of the sensor lens assembly 100 can be increased.

The sealing compound 45 of the present embodiment is opaque for blocking a visible light from passing therethrough. The sealing compound 45 is a liquid encapsulation and is formed on the upper surface 11 of the circuit board 1. The sensor chip 41, the supporting layer 43, the light-permeable layer 44, and at least part of each of the metal wires 42 are embedded in the sealing compound 45, and at least part of the outer surface 443 of the light-permeable layer 44 is exposed from the sealing compound 45, but the present disclosure is not limited thereto.

The retaining wall 5 is arranged in the distribution space S, the retaining wall 5 is disposed on the circuit board 1 (e.g., the first surface 11) and abuts against an outer side of the sealing compound 45, and the at least one passive electronic component 3 is arranged outside of the retaining wall 5. Accordingly, during the forming of the sealing compound 45, the retaining wall 5 can be provided as a boundary of the sealing compound 45, thereby preventing the sealing compound 45 from overflowing to cover the at least one passive electronic component 3.

Second Embodiment

Figure 6:
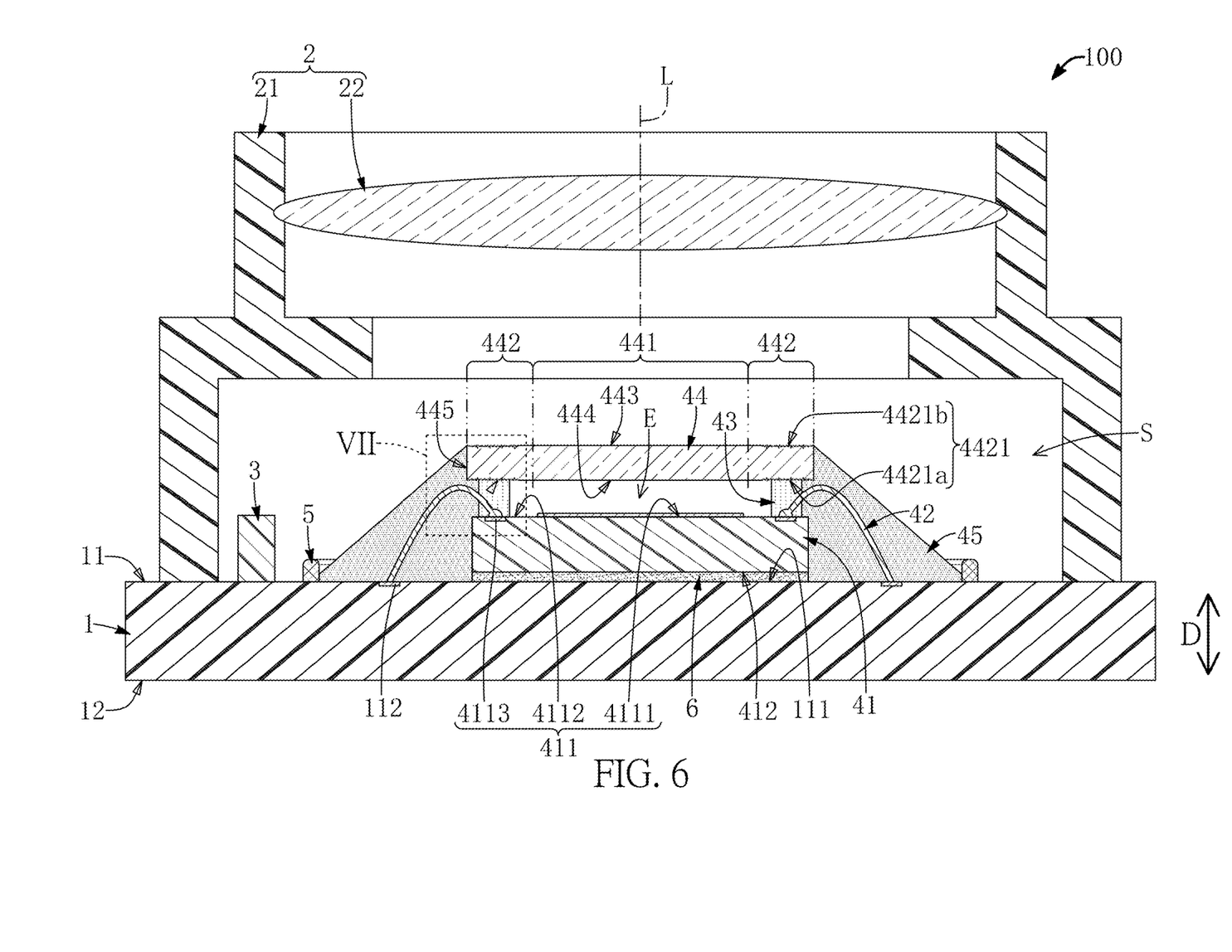
FIG. 6 is a cross-sectional view of the sensor lens assembly according to a second embodiment of the present disclosure.
Figure 7:
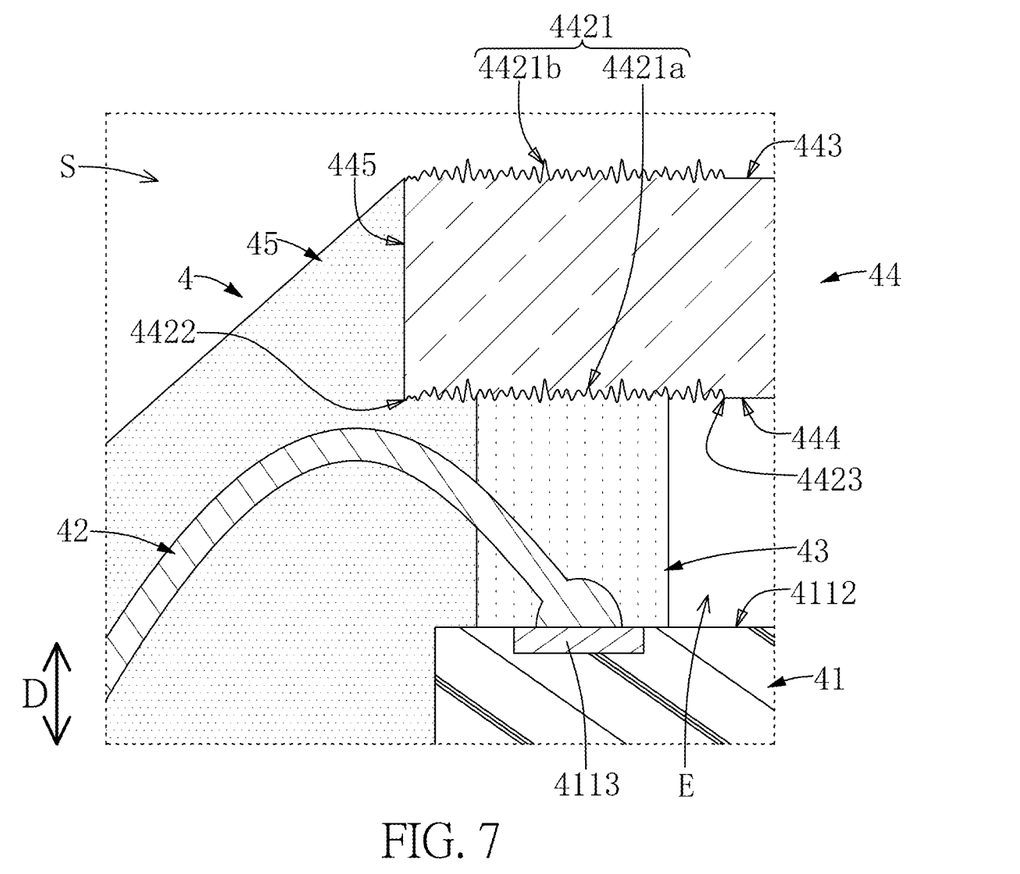
FIG. 7 is an enlarged view of part VII of FIG. 6.

Referring to FIG. 6 and FIG. 7, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, the ring-shaped roughened region 4421 includes a first portion 4421a and a second portion 4421b that is separate from the first portion 4421a. The first portion 4421a is formed on a part of the inner surface 444 arranged on the ring-shaped segment 442, and the second portion 4421b is formed on a part of the outer surface 443 arranged on the ring-shaped segment 442. Moreover, an outer edge 4422 of the first portion 4421a of the ring-shaped roughened region 4421 is arranged outside of the supporting layer 43, and an inner edge 4423 of the first portion 4421a of the ring-shaped roughened region 4421 is arranged in the enclosed space S and is not in contact with the transparent segment 441.

Third Embodiment

Figure 8:
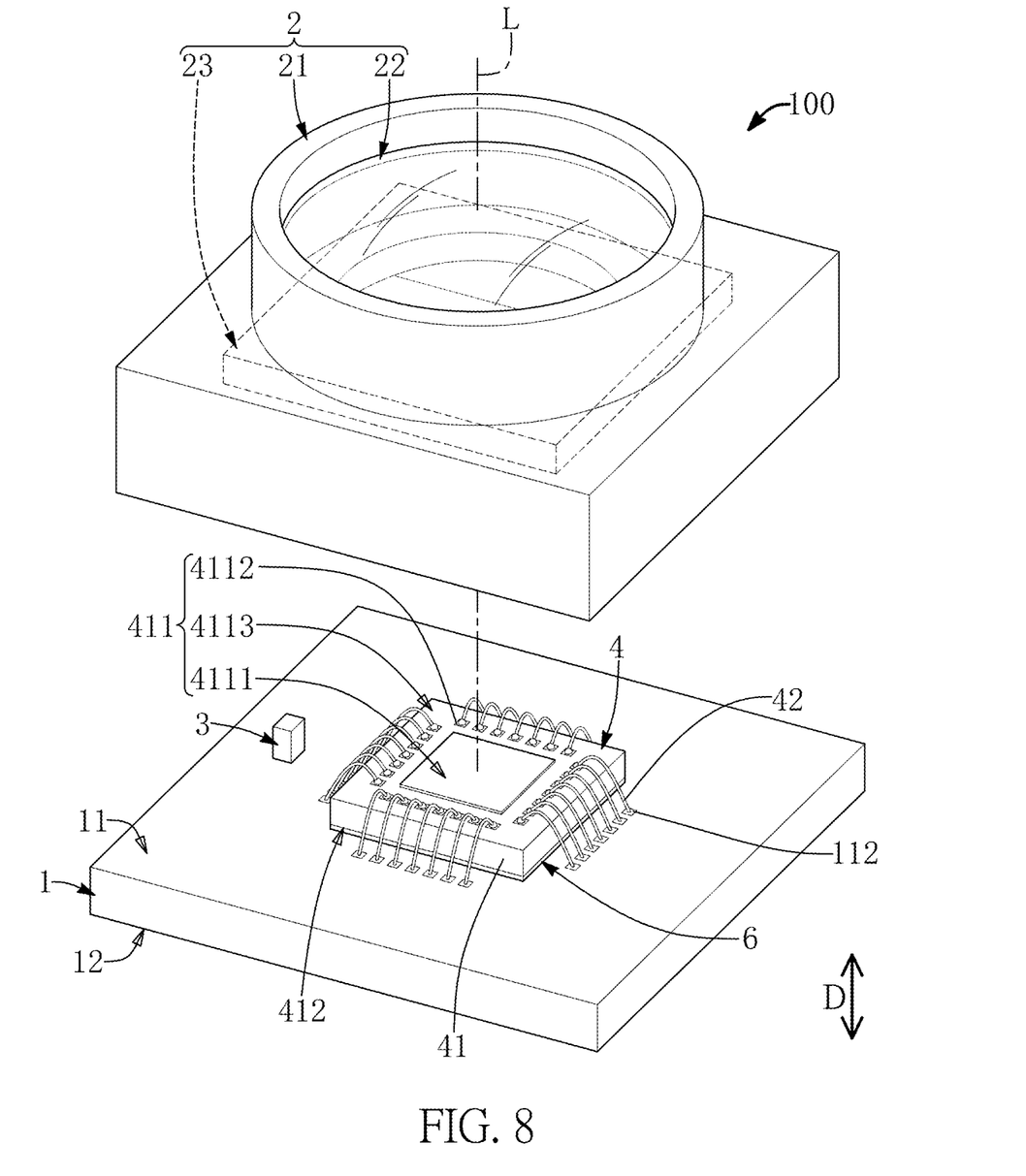
FIG. 8 is a perspective view of the sensor lens assembly according to a third embodiment of the present disclosure.
Figure 9:
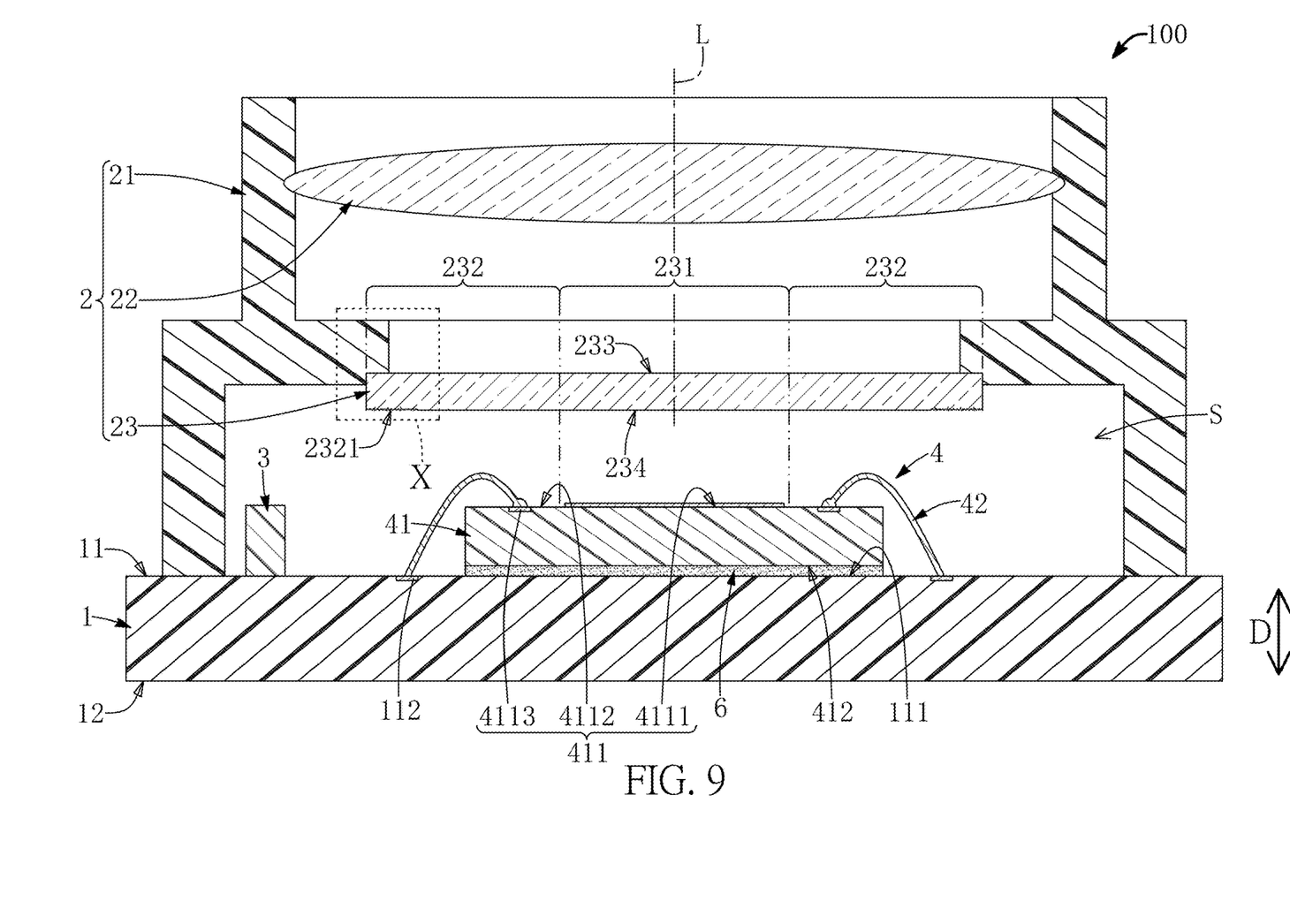
FIG. 9 is a cross-sectional view of the sensor lens assembly according to the third embodiment of the present disclosure.
Figure 10:
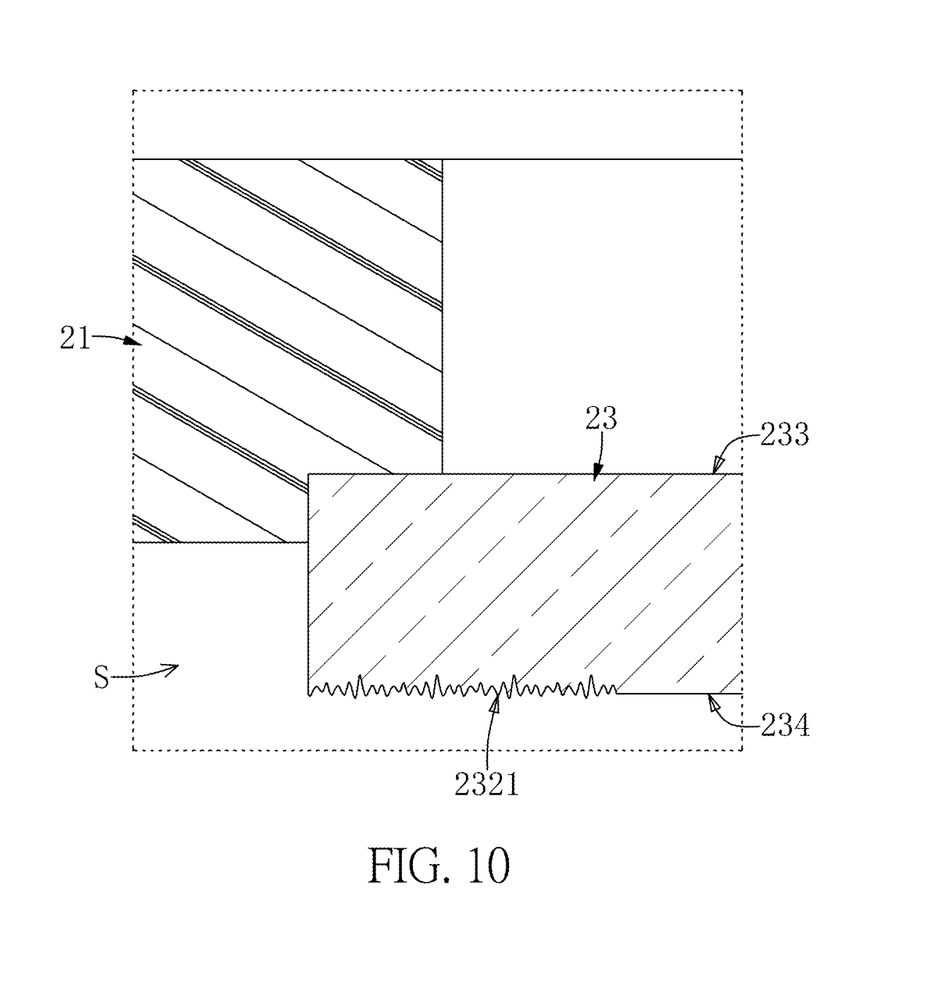
FIG. 10 is an enlarged view of part X of FIG. 9.

Referring to FIG. 8 to FIG. 10, a third embodiment of the present disclosure, which is similar to the first embodiment of the present disclosure, is provided. For the sake of brevity, descriptions of the same components in the first and third embodiments of the present disclosure will be omitted herein, and the following description only discloses different features between the first and third embodiments.

In the present embodiment, the sensor lends assembly 100 is provided by omitting the retaining wall 5, the sensing module 4 is provided by omitting the supporting layer 43, the light-permeable layer 44, and the sealing compound 45, and the optical module 2 further includes a light-permeable layer 23 assembled into the frame 21. The distribution space S in the present embodiment is surroundingly defined by the circuit board 1, the frame 21, and the light-permeable layer 23, and the at least one lens 22 is arranged outside of the distribution space S.

Specifically, the light-permeable layer 23 in the present embodiment is a transparent and flat glass board, but the present disclosure is not limited thereto. The light-permeable layer 23 has a transparent segment 231 and a ring-shaped segment 232 that surrounds the transparent segment 231. The light-permeable layer 23 is fixed to the frame 21 through the ring-shaped segment 232, so that an inner surface 234 of the light-permeable layer 23 faces toward the sensor chip 41 and the metal wires 42, and an outer surface 233 of the light-permeable layer 23 faces toward the at least one lens 22.

It should be noted that the shape and size of the transparent segment 231 in the present embodiment substantially correspond to those of the sensing region 4111; in other words, a projection region defined by orthogonally projecting the transparent segment 231 onto the top surface 411 of the sensor chip 41 along the predetermined direction D is substantially overlapped with an entirety of the sensing region 4111, but the present disclosure is not limited thereto. For example, in other embodiments of the present disclosure not shown in the drawings, the size of the transparent segment 231 can be slightly greater than that of the sensing region 4111.

Moreover, the ring-shaped segment 232 has a ring-shaped roughened region 2321, and the ring-shaped roughened region 2321 in the present embodiment is formed on the inner surface 234 of the light-permeable layer 23. The ring-shaped roughened region 2321 in the present embodiment has a haze being within a range from 10% to 90%, and the haze is preferably within a range from 30% to 90%, but the present disclosure is not limited thereto.

Specifically, a projection space defined by orthogonally projecting the ring-shaped roughened region 2321 toward the circuit board 1 (along the predetermined direction D) overlaps the metal wires 42 and surrounds the sensing region 4111. Accordingly, since the sensor lens assembly 100 of the present embodiment is provided with the ring-shaped roughened region 2321 formed on the ring-shaped segment 232 of the light-permeable layer 23, light traveling on the ring-shaped roughened region 2321 by passing through the light-permeable layer 23 can be scattered, thereby effectively reducing the flare phenomenon of the sensor lens assembly 100 (e.g., the flare phenomenon of the sensor lens assembly 100 resulting from the light reflected by any one of the metal wires 42).

In addition, the sensor lens assembly 100 can be provided with at least one passive electronic component 3 assembled to the circuit board 1 according to design requirements. The at least one passive electronic component 3 is arranged in the distribution space S and is arranged outside of the metal wires 42.

Beneficial Effects of the Embodiments

In conclusion, since the sensor lens assembly of the present disclosure is provided with the ring-shaped roughened region formed on the ring-shaped segment of the light-permeable layer, light traveling on the ring-shaped roughened region by passing through the light-permeable layer can be scattered, thereby effectively reducing the flare phenomenon of the sensor lens assembly.

Moreover, the sensor lens assembly of the present disclosure is provided with the ring-shaped roughened region formed on the ring-shaped segment of the light-permeable layer, so that the bonding force between the light-permeable layer and the supporting layer can be increased for effectively preventing the light-permeable layer from peeling off the supporting layer or preventing the light-permeable layer and the supporting layer from having a delamination therebetween.

In addition, when the supporting layer of the sensor lens assembly provided by the present disclosure is the light curing layer, the ring-shaped roughened region enables a lot of light to be scattered onto the supporting layer by having a specific condition, so that the supporting layer can be entirely solidified to prevent the light-permeable layer from being tilted and to further prevent the supporting layer and the light-permeable layer from having the delamination therebetween. Accordingly, the yield of the sensor lens assembly can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensor lens assembly, comprising:
   a circuit board;
   an optical module including:
      a frame fixed to the circuit board; and
      at least one lens assembled into the frame, wherein the circuit board, the frame, and the at least one lens jointly define a distribution space;
   a sensing module arranged in the distribution space and including:
      a sensor chip disposed on and electrically coupled to the circuit board, wherein a top surface of the sensor chip includes a sensing region and a carrying region that surrounds the sensing region;
      a supporting layer having a ring shape and being disposed on the carrying region of the sensor chip;
      a light-permeable layer having an outer surface and an inner surface that is opposite to the outer surface, wherein the light-permeable layer has a transparent segment and a ring-shaped segment that surrounds the transparent segment, and wherein the ring-shaped segment is disposed on the supporting layer, and the light-permeable layer, the supporting layer, and the sensor chip jointly define an enclosed space; and
      a sealing compound formed on the circuit board, wherein the sensor chip, the supporting layer, and the light-permeable layer are embedded in the sealing compound, and at least part of the outer surface of the light-permeable layer is exposed from the sealing compound; and
   a retaining wall arranged in the distribution space, wherein the retaining wall is disposed on the circuit board and abuts against an outer side of the sealing compound;
   wherein the ring-shaped segment has a ring-shaped roughened region, and a projection space defined by orthogonally projecting the ring-shaped roughened region toward the top surface of the sensor chip is located outside of the sensing region and overlaps an entirety of the supporting layer and a part of the enclosed space.

2. The sensor lens assembly according to claim 1, wherein the ring-shaped roughened region has a haze being within a range from 10% to 90%.

3. The sensor lens assembly according to claim 1, wherein the ring-shaped roughened region is formed on the inner surface of the light-permeable layer, an outer edge of the ring-shaped roughened region is arranged outside of the supporting layer, and an inner edge of the ring-shaped roughened region is flush with an inner side of the supporting layer.

4. The sensor lens assembly according to claim 1, wherein the ring-shaped roughened region includes a first portion formed on the inner surface and a second portion that is formed on the outer surface, and wherein an outer edge of the first portion of the ring-shaped roughened region is arranged outside of the supporting layer, and an inner edge of the first portion of the ring-shaped roughened region is arranged in the enclosed space.

5. The sensor lens assembly according to claim 1, wherein the supporting layer is an ultraviolet (UV) curing layer, and the light-permeable layer is configured to allow light passing through the ring-shaped segment to be scattered at the ring-shaped roughened region toward the supporting layer.

6. The sensor lens assembly according to claim 1, wherein the sensing module further includes:
   a plurality of metal wires, wherein two ends of each of the metal wires are respectively connected to the circuit board and the carrying region of the sensor chip, so that the circuit board and the sensor chip are electrically coupled to each other;
   wherein at least part of each of the metal wires is embedded in the sealing compound.

7. The sensor lens assembly according to claim 1, further comprising at least one passive electronic component arranged in the distribution space, wherein the at least one passive electronic component is assembled onto the circuit board and is arranged outside of the retaining wall.

8. A sensor lens assembly, comprising:
   a circuit board;
   an optical module including:
      a frame fixed to the circuit board;
      at least one lens assembled into the frame; and
      a light-permeable layer assembled into the frame, wherein the circuit board, the frame, and the light-permeable layer jointly define a distribution space, and the at least one lens is arranged outside of the distribution space;
   wherein the light-permeable layer having an outer surface and an inner surface that is opposite to the outer surface, wherein the light-permeable layer has a transparent segment and a ring-shaped segment that surrounds the transparent segment, and the ring-shaped segment has a ring-shaped roughened region; and
   a sensing module arranged in the distribution space and including:
      a sensor chip disposed on the circuit board, wherein a top surface of the sensor chip includes a sensing region and a carrying region that surrounds the sensing region; and
      a plurality of metal wires, wherein two ends of each of the metal wires are respectively connected to the circuit board and the carrying region of the sensor chip, so that the circuit board and the sensor chip are electrically coupled to each other;

wherein a projection space defined by orthogonally projecting the ring-shaped roughened region toward the circuit board overlaps the metal wires and surrounds the sensing region.

9. The sensor lens assembly according to claim 8, wherein the ring-shaped roughened region is formed on the inner surface of the light-permeable layer, and the ring-shaped roughened region has a haze being within a range from 10% to 90%, and wherein the sensor lens assembly further includes at least one passive electronic component arranged in the distribution space, and the at least one passive electronic component is assembled onto the circuit board and is arranged outside of the metal wires.

* * * * *